US011206822B2

(12) United States Patent
Aston et al.

(10) Patent No.: US 11,206,822 B2
(45) Date of Patent: Dec. 28, 2021

(54) VENTED, WATERPROOF CONTAINER SYSTEM AND METHOD

(71) Applicants: Eric E. Aston, Farmington, UT (US); Kenneth I. Aston, Oakley, UT (US); Timothy G. Jenkins, Heber, UT (US)

(72) Inventors: Eric E. Aston, Farmington, UT (US); Kenneth I. Aston, Oakley, UT (US); Timothy G. Jenkins, Heber, UT (US)

( * ) Notice: Subject to any disclaimer, the term of this patent is extended or adjusted under 35 U.S.C. 154(b) by 431 days.

(21) Appl. No.: 16/112,571

(22) Filed: Aug. 24, 2018

(65) Prior Publication Data

US 2019/0059348 A1 Feb. 28, 2019

Related U.S. Application Data

(60) Provisional application No. 62/550,476, filed on Aug. 25, 2017.

(51) Int. Cl.
*A01K 97/06* (2006.01)

(52) U.S. Cl.
CPC .................................. *A01K 97/06* (2013.01)

(58) Field of Classification Search
CPC ........ A01K 97/06; A01K 97/04; A01K 97/05; A01K 97/08; B65D 51/18; B65D 2251/0003; B65D 2251/0006; B65D 2251/0012; B65D 2251/0015; B65D 2251/0018; B65D 2251/0025; B65D 2251/0028
USPC ........... 43/54.1, 57.1, 57.2; 206/315.11, 204; 224/920; 220/254.1, 254.6, 256.1, 360, 220/361, 367.1; 426/443, 465, 489; 99/467

See application file for complete search history.

(56) References Cited

U.S. PATENT DOCUMENTS

| | | | | |
|---|---|---|---|---|
| 1,999,779 A | * | 4/1935 | Perrine ................. | A01K 97/06 43/57.2 |
| 2,028,030 A | * | 1/1936 | Walker .................... | A24F 15/12 206/89 |
| 4,073,085 A | * | 2/1978 | Stremeckus ........... | A01K 97/06 43/54.1 |

(Continued)

OTHER PUBLICATIONS

Gore Vents, https://www.gore.com/products/categories/venting, accessed Nov. 20, 2018, pp. 1-12.

(Continued)

*Primary Examiner* — Darren W Ark
*Assistant Examiner* — Katelyn T Truong
(74) *Attorney, Agent, or Firm* — Warren M. Pate; Pate Peterson, PLLC

(57) ABSTRACT

A vented, waterproof container is disclosed. The container may include a base and a cover. The cover may pivotably engage the base and pivot with respect to the base through a range of motion. The range of motion may include a closed position wherein the cover and base cooperate to form an enclosure. One or more apertures may pass through at least one of the base and the cover. At least one membrane may cover the one or more apertures. The at least one membrane may be permeable to water vapor and impermeable to liquid water. Accordingly, the at least one membrane may block liquid water from entering the container through the one or more apertures yet permit water vapor to escape the container through the one or more apertures.

16 Claims, 12 Drawing Sheets

(56) References Cited

U.S. PATENT DOCUMENTS

| | | | | |
|---|---|---|---|---|
| 4,949,847 A | * | 8/1990 | Nagata | F25D 25/005 206/484.1 |
| 5,730,311 A | * | 3/1998 | Curtis | B65D 21/0222 206/508 |
| 6,527,113 B2 | | 3/2003 | Blake | |
| 8,607,498 B1 | * | 12/2013 | Smith | A01K 97/05 43/56 |
| 9,913,463 B2 | | 3/2018 | Aston et al. | |
| 2013/0240531 A1 | * | 9/2013 | Abraham | B65D 51/1616 220/373 |
| 2015/0284151 A1 | * | 10/2015 | Blagojevic | B65D 53/00 206/3 |
| 2016/0205913 A1 | | 7/2016 | Aston et al. | |
| 2018/0042209 A1 | | 2/2018 | Aston et al. | |

OTHER PUBLICATIONS

Gore Vents, Protective Vents Pressure Video, https://www.youtube.com/watch?v=x832kshrYio, published Jan. 20, 2014, pp. 1-3.
Plan D Articulated Fly Boxes—New and Improved, https://www.deneki.com/2018/02/plan-d-new-articulated-fly-boxes/, published Feb. 23, 2018, pp. 1-5.

* cited by examiner

VENTED, WATERPROOF CONTAINER SYSTEM AND METHOD

RELATED APPLICATIONS

This application claims the benefit of U.S. Provisional Patent Application Ser. No. 62/550,476 filed Aug. 25, 2017, which is hereby incorporated by reference.

FIELD OF THE INVENTION

This disclosure relates to fishing products and more particularly to systems and methods for storing fishing lures, fishing hooks, and artificial fishing flies.

BACKGROUND OF THE INVENTION

In the past, fishing tackle in the form of fishing lures, hooks, and artificial flies have often been stored in a box. Such boxes have certain drawbacks. Accordingly, what is needed are new containers for storing fishing tackle.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
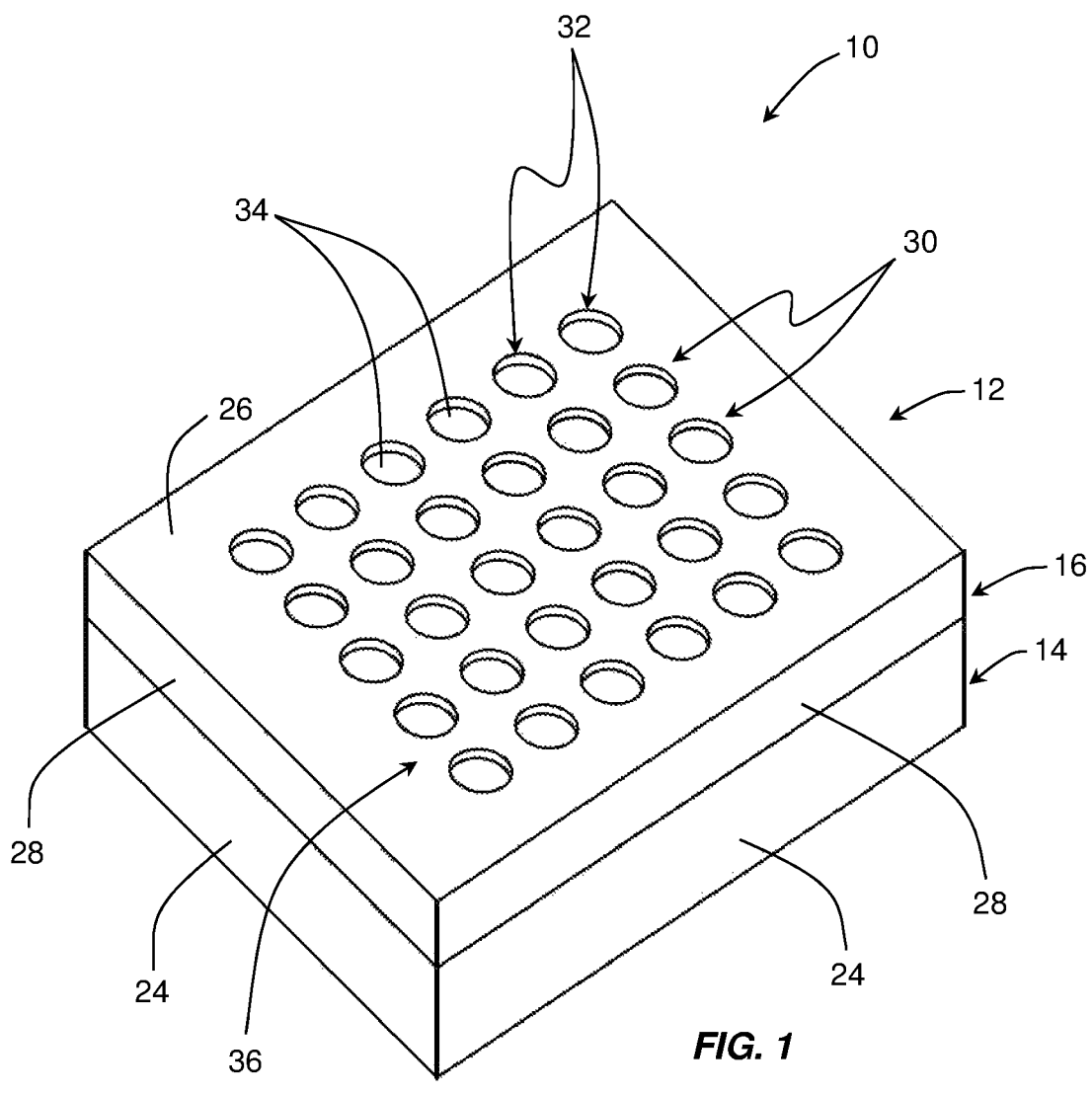
FIG. 1 is a perspective view of one embodiment of a vented container in accordance with the present invention with the cover in a closed position.
Figure 1:
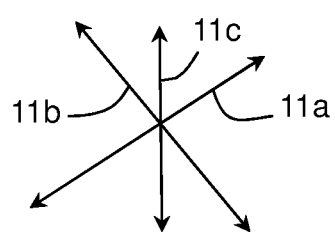

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 2:
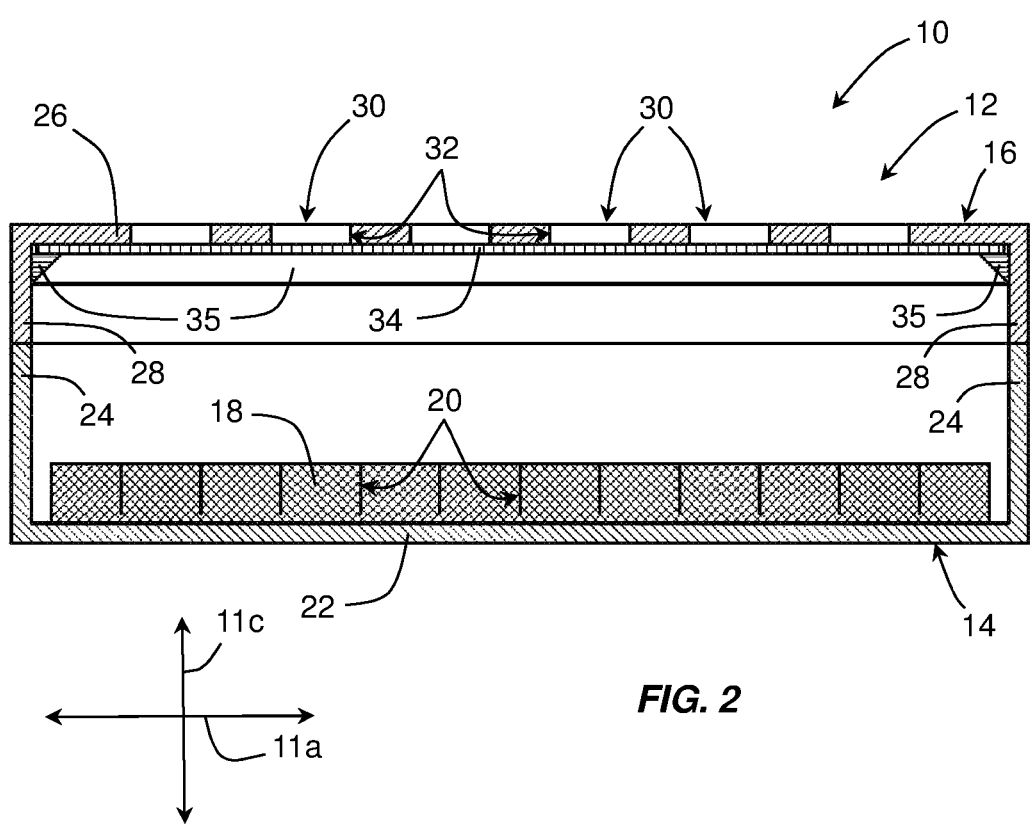
FIG. 2 is a cross-sectional view of the container of FIG. 1.
Figure 3:
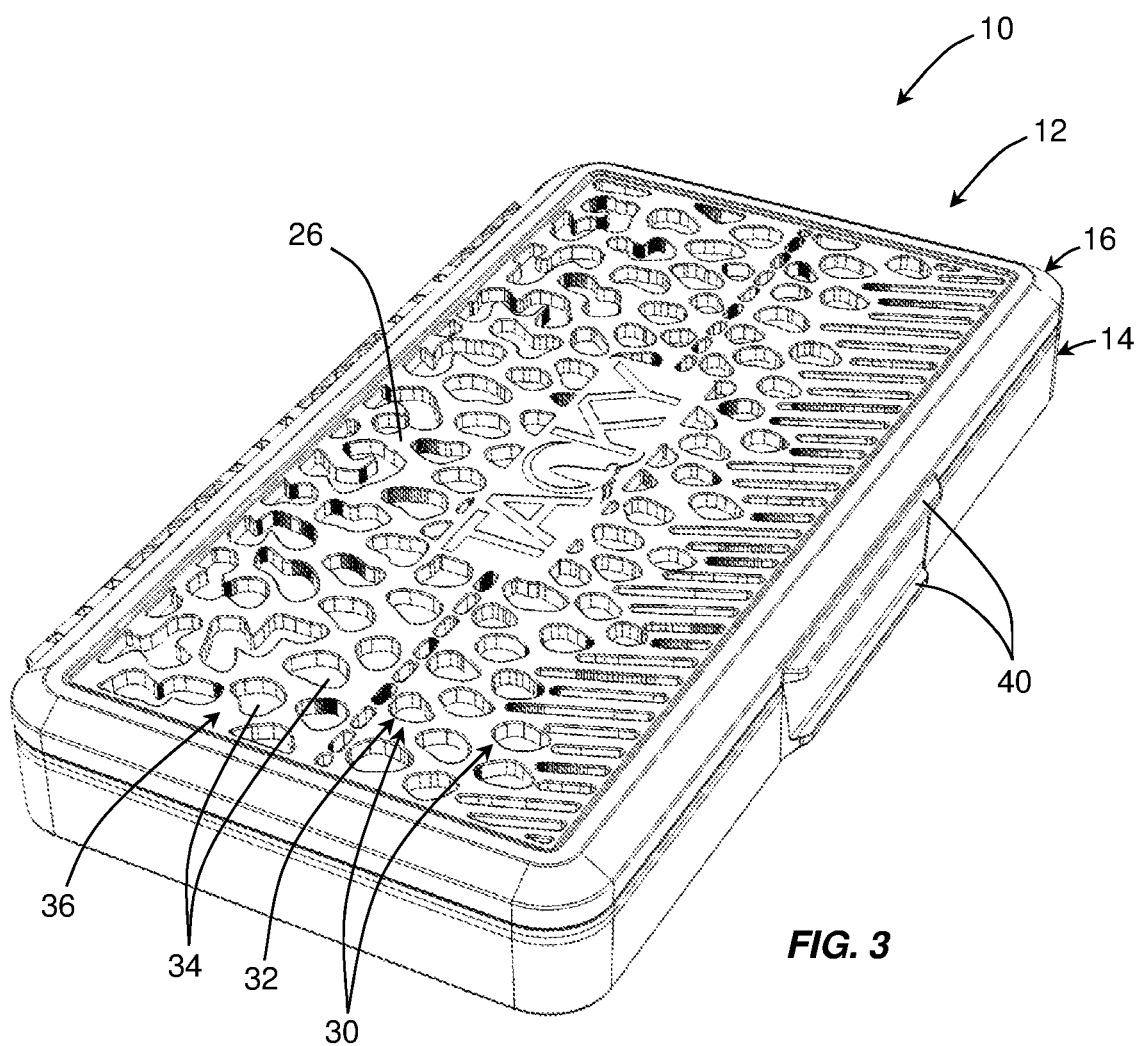
FIG. 3 is a top perspective view of an alternative embodiment of a vented, waterproof container in accordance with the present invention with the cover in a closed position.
Figure 4:
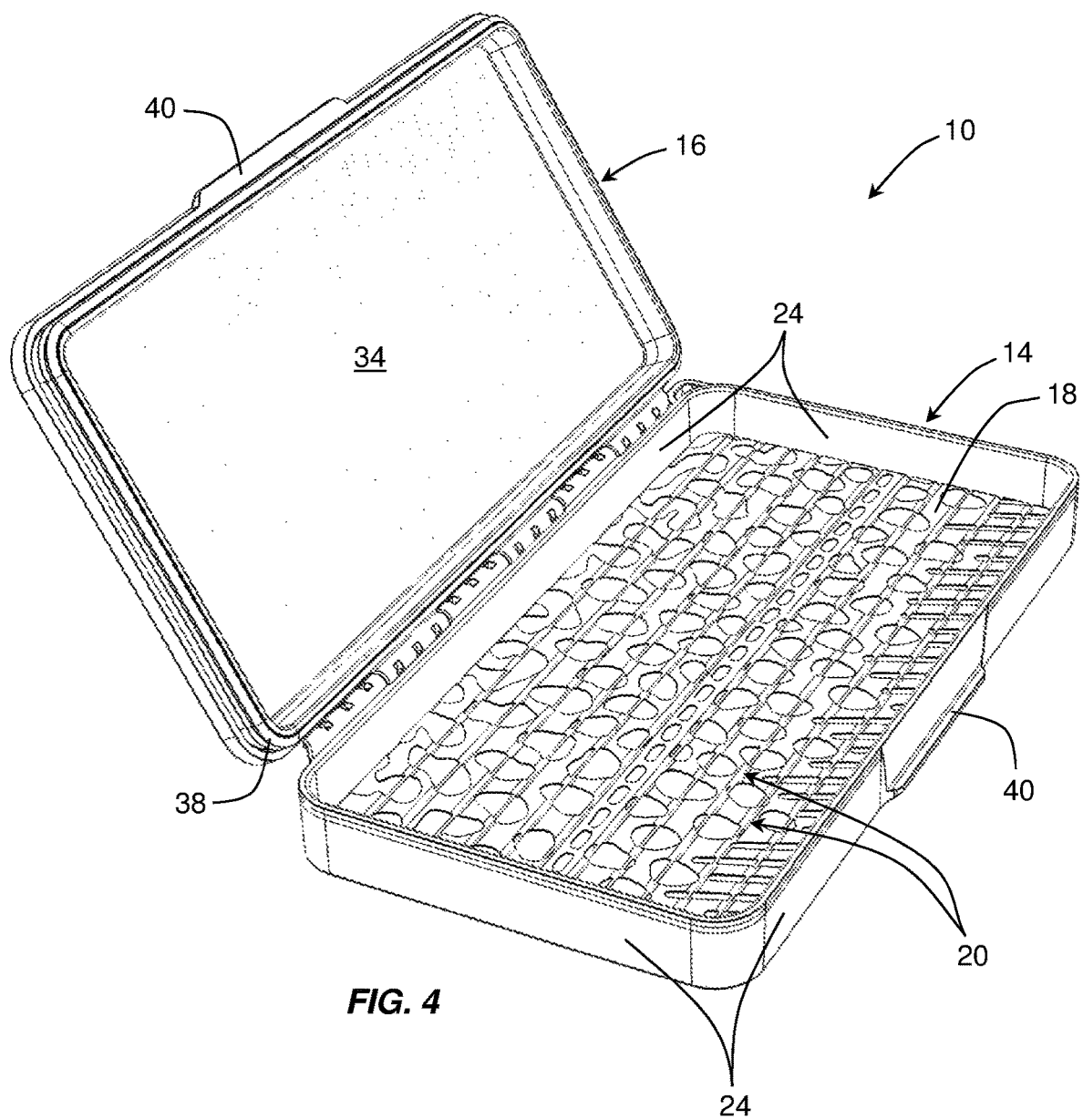
FIG. 4 is a top perspective view of the container of FIG. 3 with the cover in an open position.
Figure 5:
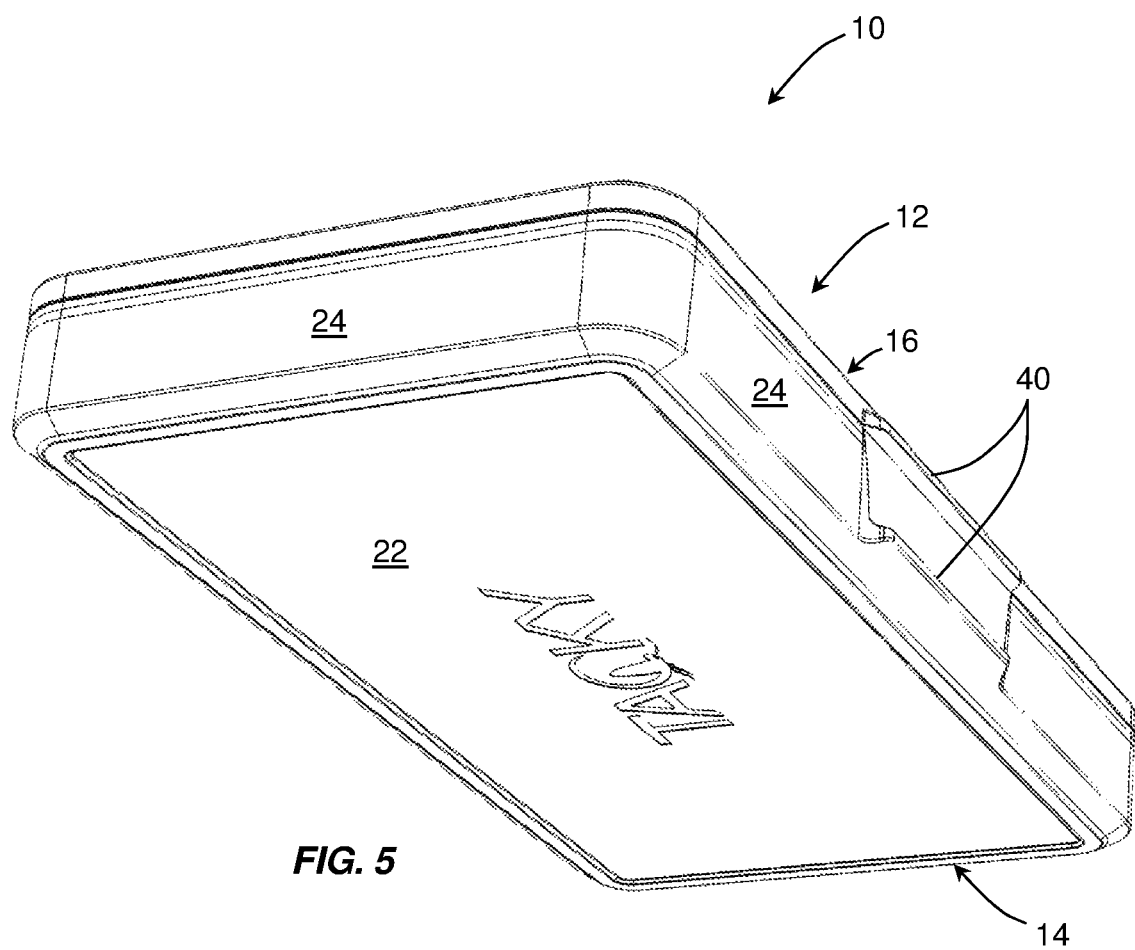
FIG. 5 is a bottom perspective view of the container of FIG. 3 with the cover in a closed position.
Figure 6:
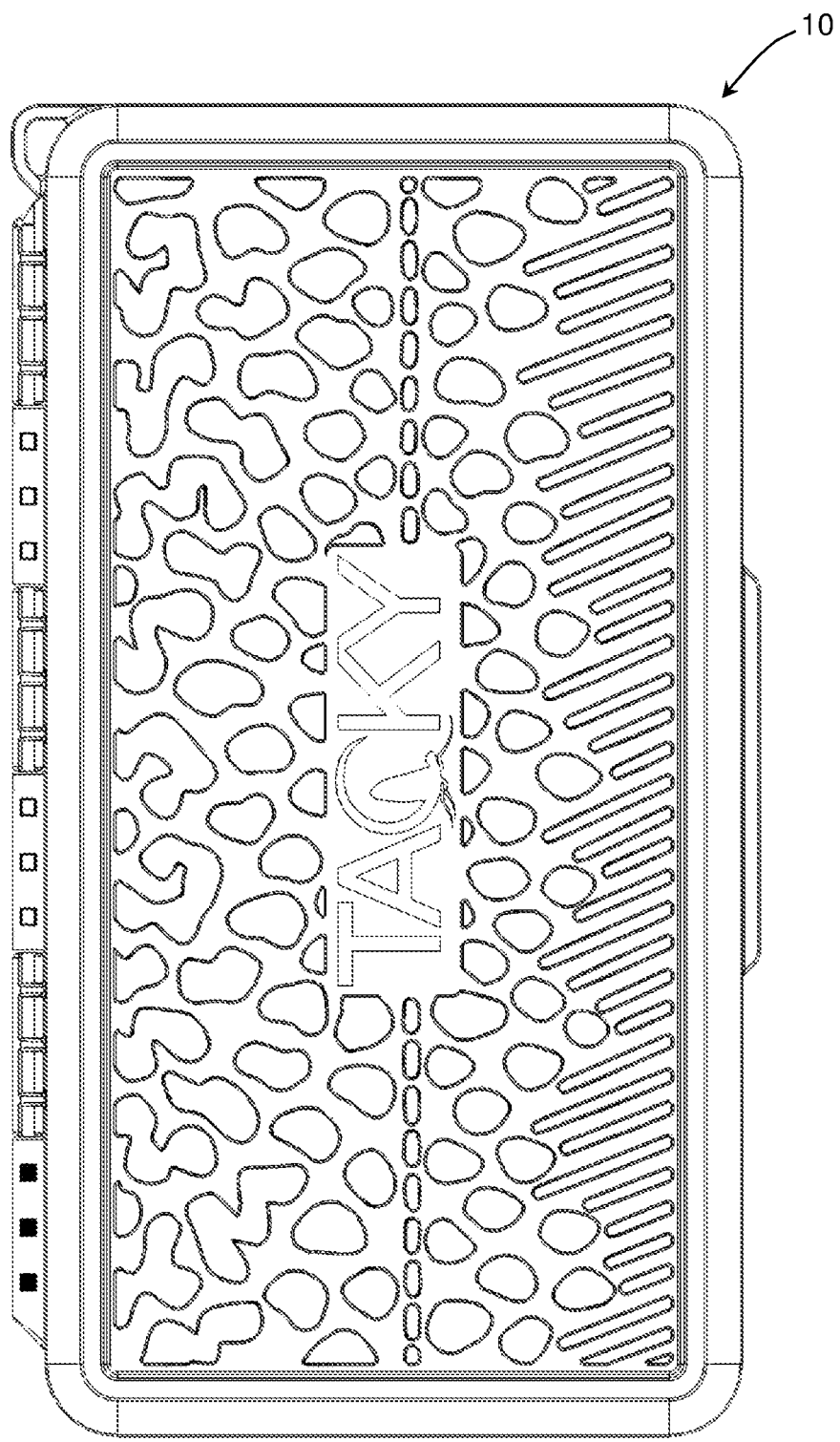
FIG. 6 is a top view of the container of FIG. 3 with the cover in a closed position.
Figure 7:
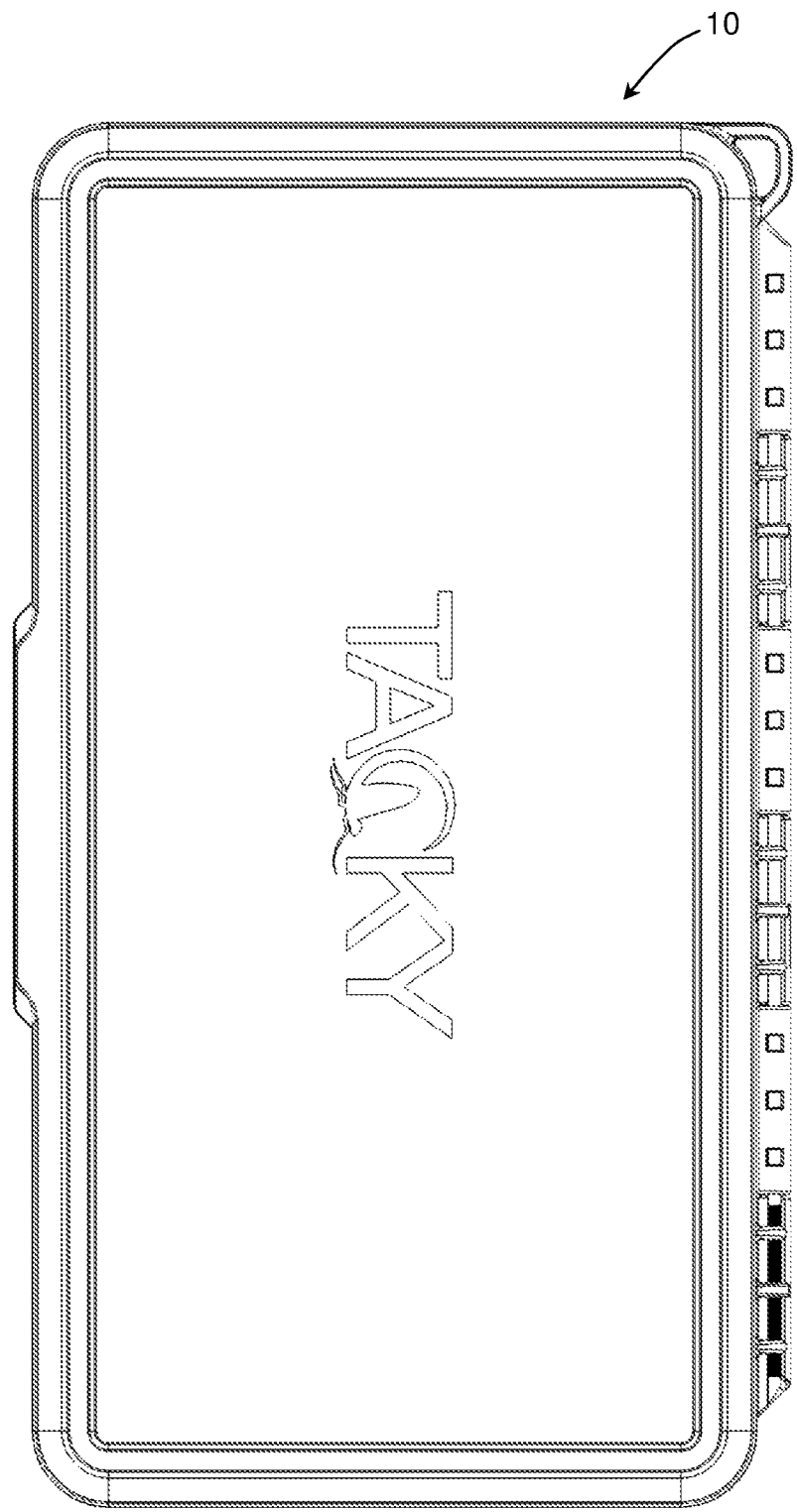
FIG. 7 is a bottom view of the container of FIG. 3 with the cover in a closed position.
Figure 8:
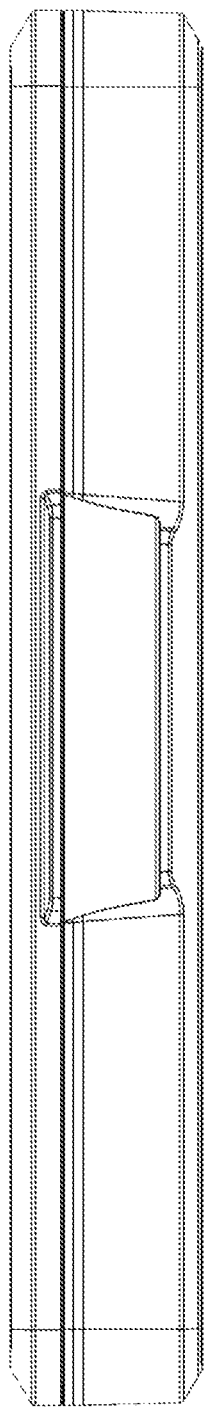
FIG. 8 is a front view of the container of FIG. 3 with the cover in a closed position.
Figure 9:
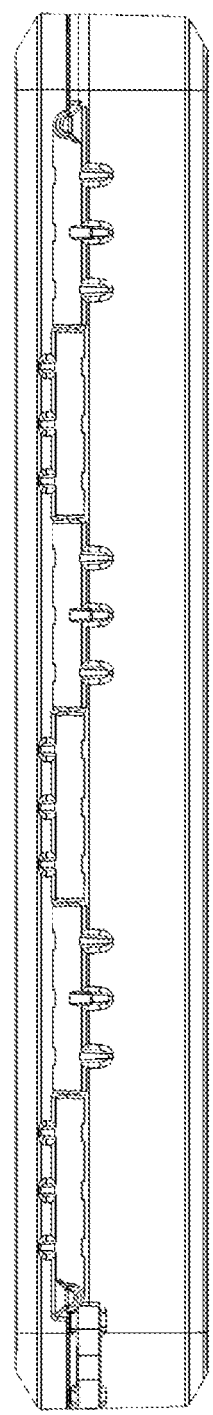
FIG. 9 is a back view of the container of FIG. 3 with the cover in a closed position.
Figure 10:
FIG. 10 is a first end view of the container of FIG. 3 with the cover in a closed position.
Figure 11:
FIG. 11 is a second, opposite end view of the container of FIG. 3 with the cover in a closed position.
Figure 12:
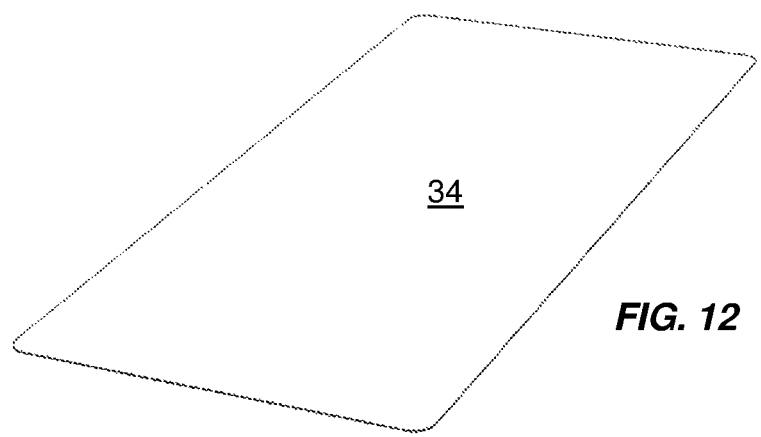
FIG. 12 is a perspective view of a membrane corresponding to the container of FIG. 3.
Figure 13:
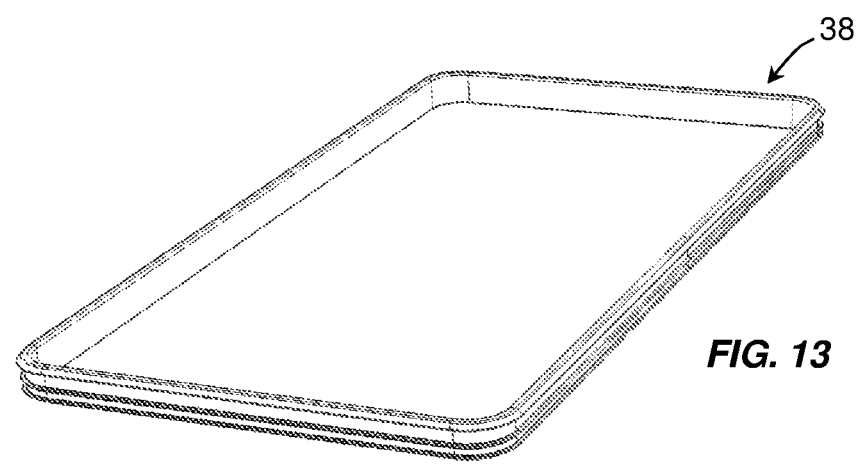
FIG. 13 is a perspective view of a seal corresponding to the container of FIG. 3.
Figure 14:
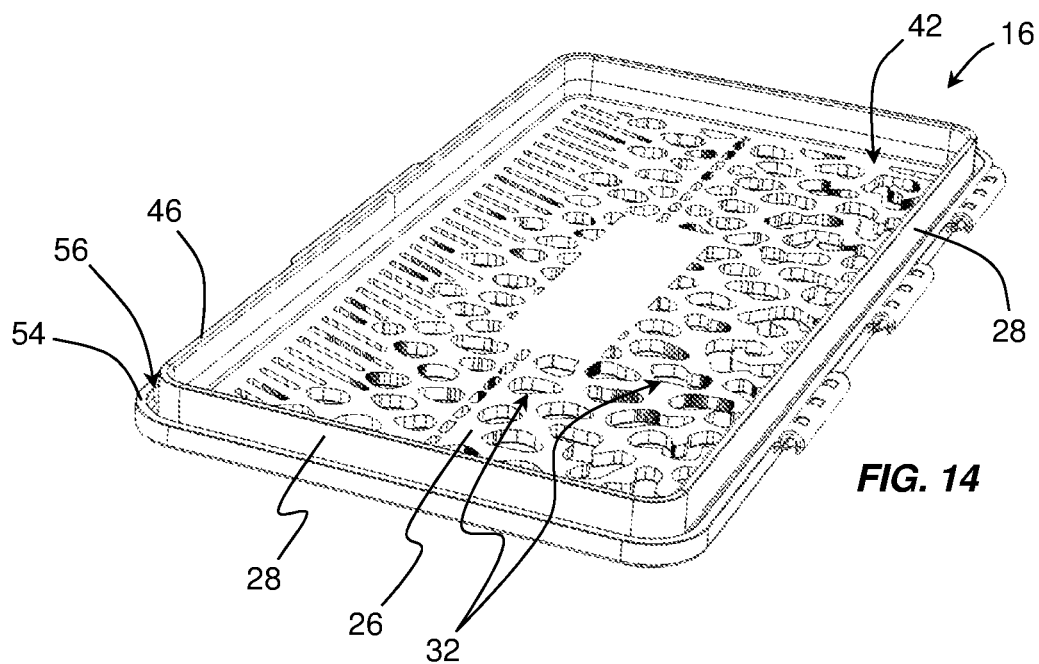
FIG. 14 is a perspective view of an underside of the cover of the container of FIG. 3.
Figure 15:
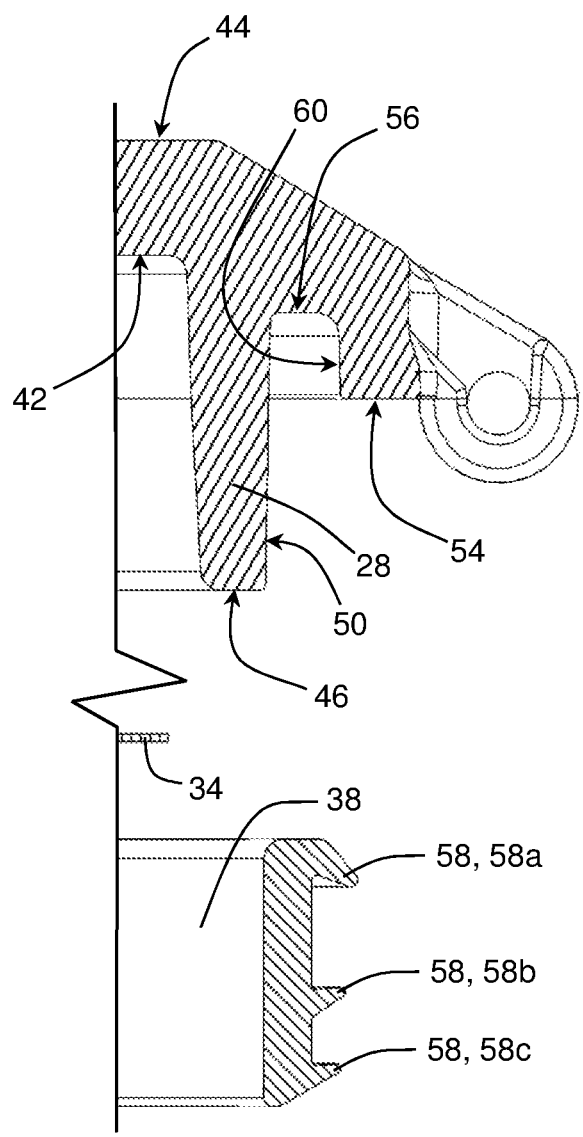
FIG. 15 is a partial, exploded, cross-sectional view of a back edge of a cover of the container of FIG. 3.
Figure 16:
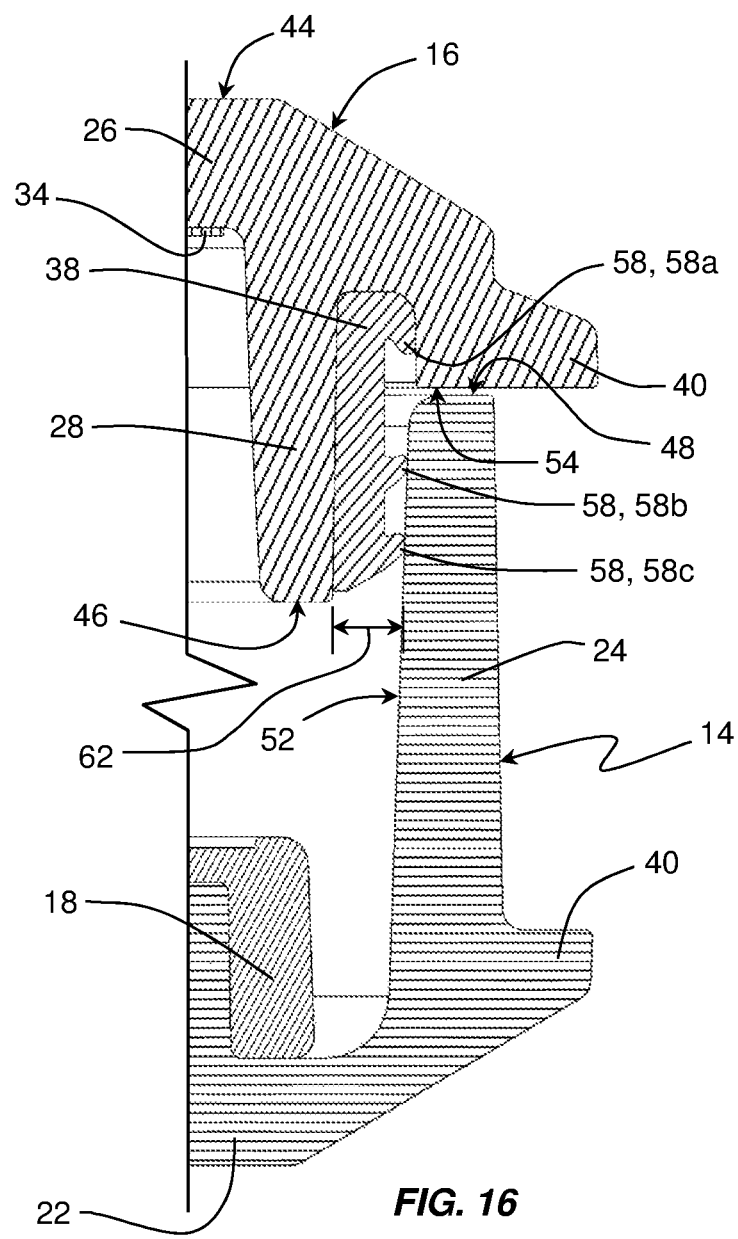
FIG. 16 is a partial cross-sectional view of a front edge of the container of FIG. 3 with the cover in a closed position.

Referring to FIGS. 1 and 2, an apparatus 10 or system 10 in accordance with the present invention may be described in terms of longitudinal 11a, lateral 11b, and transverse 11c directions extending substantially orthogonally with respect to one another. Accordingly, in selected embodiments, an apparatus 10 or system 10 may comprise a container 12 having a length extending in a longitudinal direction 11a, a width in a lateral direction 11b, and a thickness in a transverse direction 11c.

In certain embodiments, a container 12 may include a base 14 and cover 16 and may house one or more inserts 18 (e.g., house multiple inserts 18 within a base 14, one or more inserts 18 within a cover 16, or some combination thereof). Such inserts 18 may, in turn, provide one or more locations 20 or retention sites 20 (e.g., slits) for securing various one or more items (e.g., artificial flies, fishing hooks, fishing lures, stick bait, or the like).

In selected embodiments, one or more inserts 18 of a system 10 may be made and/or secured within a container 12 as described in U.S. Provisional Patent Application Ser. No. 61/962,785 filed Nov. 18, 2013, U.S. patent application Ser. No. 14/547,037 filed Nov. 18, 2014, U.S. Provisional Patent Application Ser. No. 62/374,796 filed Aug. 13, 2016, U.S. Provisional Patent Application Ser. No. 62/511,891 filed May 26, 2017, U.S. Provisional Patent Application Ser. No. 62/512,651 filed May 30, 2017, U.S. patent application Ser. No. 15/675,738 filed Aug. 12, 2017, and U.S. patent application Ser. No. 15/992,153 filed May 29, 2018, each of which is hereby incorporated by reference.

A base 14 may have an interior volume. For example, a base 12 may include a bottom panel 22 and various side walls 24 (e.g., four side walls 24). The bottom panel 22 and side walls 24 may be connected (e.g., monolithically formed) together. The interior length and width of the bottom panel 22 and the interior height of the side walls 24 may collectively define an interior volume corresponding to a base 14.

A cover 16 may also have an interior volume. For example, a cover 16 may include a top panel 26 and various side walls 28 (e.g., four side walls 28). The top panel 26 and side walls 28 may be connected (e.g., monolithically formed) together. The interior length and width of the top panel 26 and the interior height of the side walls 28 may collectively define an interior volume corresponding to a cover 16. A cover 16 may have an interior volume that is different from an interior volume of a corresponding base 14. Alternatively, a cover 16 may have an interior volume that is equal or substantially equal to an interior volume of a corresponding base 14.

In selected embodiments, a cover 16 may pivotably engage a base 14. Accordingly, a cover 16 may pivot with respect to a base 14 through a range of motion. Such a range of motion may include a closed position at one extreme thereof and a fully open position at an opposite extreme thereof. When in the closed position, a cover 16 may cooperate with a base 14 to form an enclosure. Such an enclosure may have an overall interior volume. For example, an enclosure may have an overall volume equal or substantially equal to the sum of the interior volume corresponding to a cover 16 and the interior volume corresponding to a base 14.

A cover 16 may pivotably engage a base 14 in any suitable manner. In selected embodiments, a cover 16 may be pivotably connected to a base 14 via a barrel hinge. For example, one or more tubular members or "barrels" may connect to (or be monolithically formed with) a cover 16 (e.g., a side wall 28 of a cover 16). One or more complementary tubular members or barrels may connect to (or be monolithically formed with) a base 14 (e.g., a side wall 24 of a base 14). Accordingly, when the various tubular members of a cover 16 and base 14 are properly aligned, a hinge pin (e.g., a metal hinge pin) may be inserted through the tubular members.

A hinge pin may maintain the tubular member in a proper alignment. However, the tubular members of one or both of a cover 16 and base 14 may be free to rotate or pivot with respect to the hinge pin. Accordingly, a cover 16 may be free to pivot through a range of motion with respect to a base 14.

A base 14 and cover 16 may be formed of any suitable material or combination of materials. In selected embodiments, a base 14 and cover 16 may each comprise a molded (e.g., injection molded) polymeric material. For example, a base 14 and cover 16 may each be molded in a polycarbonate material.

A base 14 and cover 16 may have differing transparency or opacity. For example, in selected embodiments, a base 14 may be opaque or substantially opaque while a cover 16 may be transparent or substantially transparent. A transparent cover 16 may enable a user to readily see what items (e.g., artificial flies, lures, hooks, or other items) are contained within the corresponding container 12 without having to first open the container 12.

A base 14 and cover 16 or portions thereof may have differing surface finishes. In certain embodiments, a base 14, cover 16, or selected portions thereof may have a textured, roughened, or "sand blasted" look or finish, while the other or other portions may have a smooth or glossy finish. For example, the exterior surfaces of the various side walls 24, 28 may have a roughened or "sand blasted" look or finish, while the exterior surfaces of the front and back panels 22, 26 may have a smooth or glossy finish.

In selected embodiments, a container 12 in accordance with the present invention may be vented. Thus, a container 12 may include one or more vents 30. A vent 30 may comprise an aperture 32 extending through some panel or wall 22, 24, 26, 28 of a container 12 and a membrane 34 extending and secured to cover the aperture 32. In certain embodiments, a membrane 34 may block or resist the passage of liquid water through the aperture 32 and into the container and permit the passage of gaseous water (i.e., water vapor) through the aperture 32 and out of the container 12. In selected embodiments, a membrane 34 may comprise e-VENT, GORE-TEX, some other waterproof, breathable, fabric membrane, or the like.

Thus, a container 12 comprising one or more vents 30 may be dropped in water, have water sprayed thereon, be rained or dripped on, etc. without liquid water entering the container 12 through the one or more vents 30. However, water on one or more fishing lures, stick baits, artificial flies, or the like housed within a container 12 may be free to evaporate and exit (e.g., via diffusion) through the one or more vents 30 of the container 12. As a result, a container 12 in accordance with the present invention may avoid prolonged exposure of the metal components (e.g., hooks) housed therewithin to water. This may prevent corrosion or other water damage that may render expensive tackle less effective.

In certain embodiments, a system 10 may also include a small battery or solar powered fan or other mechanism to move or circulate air within the container 12 to increase evaporation and the passage of water vapor through one or more vents 30.

A membrane 34 may be held in place over one or more apertures 32 in any suitable manner. In selected embodiments, one or more membranes 34 may extend on an interior surface of a panel and/or wall 22, 24, 26, 28 of a container 12 so as to cover or extend over one or more apertures 32. The membrane 34 may be held on that interior surface by an adhesive, using an ultrasonic or heat welding process, via a bezel 35 extending around a perimeter of a membrane 34 or one or more apertures 32 and clamping the membrane 34 to a corresponding panel or wall 22, 24, 26, 28, or the like.

For example, in certain embodiments, one or more apertures 32 may extend through a top panel 26 of a cover 16. A membrane 34 may be sized to cover an interior surface of the top panel 26 (i.e., the membrane 34 may have a length and width matching or substantially matching that of the interior surface of the top panel 26). Accordingly, glue or some other adhesive may be applied to various locations on the interior surface of the top panel 26 (e.g., locations such as the perimeter of the interior surface of the top panel 26, behind an area corresponding to a logo or trademark, between one or more apertures 32, or the like or a combination, or sub-combination thereof). A membrane 34 may then be aligned with the interior surface of the top panel 26 and urged against the glue or other adhesive. Additionally, a bezel 35 extending around a perimeter of the interior surface of the top panel 26 may be applied to hold a membrane 34 against that interior surface. The bezel 35 may be glued, mechanically fastened, or otherwise secured in place. Thus, glue or glue in combination with a bezel 35 may be used to hold a membrane 34 in place.

In selected embodiments, a container 12 may comprise an array 36 (e.g., a two dimensional array) of vents 30. The array 36 of vents 30 may be sized to collectively provide sufficient area of exposed membrane 34 to enable a relatively rapid passage of water vapor out of a closed container 12. Additionally, the array 36 of vents 30 may include an array of discrete apertures 32 that form a protective cover for the membrane 34. That is, the individual apertures 32 may be sufficiently small and/or distributed to prevent a membrane 34 from having to carry certain loads (e.g., loads corresponding to a user gripping the container 12, loads corresponding to items abutting against or being stacked upon a container 12, etc.) or being punctured (e.g., being pierced by other items carried within a bag or the like).

Referring to FIGS. 3-11, in certain embodiments, one or more apertures 32 may collectively form an icon, trademark, or the like. For example, one or more apertures 32 may form a logo, spell out a trademark, or the like. Alternatively, one or more apertures 32 may form a pattern related in some way to the items to be stored in the system 10. For example, if a system 10 is configured to store fishing tackle, one or more apertures 32 may form a pattern resembling the colorations of a fish. Thus, an array 36 of vents 30 may enhance and not degrade the aesthetic appeal of a system 10 in accordance with the present invention.

In selected embodiments, an interface between a base 14 and a cover 16 may be sealed in an effort to make the resulting system 10 waterproof. For example, a container 12 may include a gasket 38 (e.g., a gasket 38 formed of an elastomeric material such as neoprene rubber, natural rubber, polyurethane, nitrile butadiene rubber, thermoplastic elastomer (TPE), silicone rubber, or the like) forming a seal between abutting or adjacent surfaces of a base 14 and cover 16. A container 12 may further include a latching mechanism that locks a container 12 shut, thereby maintaining a seal between the base 14 and cover 16 (e.g., maintaining an adequate and substantially uniform compression of the gasket 38).

Alternatively, a system 10 in accordance with the present invention may be latchless. For example, in certain embodiments, a gasket 38 may contact both a base 14 and a cover 16 and create a watertight interface therebetween when the cover 16 is in the closed position. The gasket 38 may hold the cover 16 in the closed position. This holding may comprise frictionally engaging, by the gasket 38, the cover 16 and the base 14 while the cover 16 is in the closed position. Accordingly, a frictional engagement provided by a gasket 38 may provide the sole mechanism holding a cover 16 in the closed position with respect to a base 14.

To assist in opening a container 12, one or both of a cover 16 and base 14 may include a grip 40. In selected embodiments, a grip 40 may include an extension. Accordingly, by engaging a grip 40, a user may obtain sufficient purchase on the corresponding base 14 and/or cover 16 to open the container 12 (e.g., overcome a frictional engagement of a gasket 38 securing a cover 16 in a closed position with respect to a base 14).

Referring to FIGS. 12-16, a cover 16 may include an interior surface 42 and an exterior surface 44. One or more apertures 32 may extend through a cover 16 from the exterior surface 44 to the interior surface 42. In selected embodiments, a membrane 34 may abut and extend along an interior surface 42. For example, in certain embodiments, one or more apertures 32 may all be located on or extend through a top panel 26. Accordingly, the depth of the one or more apertures 32 may be equal to the thickness of the top panel 26. A membrane 34 may be sized and shaped to abut and cover an interior surface 42 of the top panel 26. In that way, a single, continuous membrane 34 extending in a single plane may cover all of the one or more apertures 32.

In selected embodiments, when in the closed position, a top 46 or distal extreme of the various side walls 28 of a cover 16 may be sized and shaped to abut or nearly abut a top 48 or distal extreme of the various side walls 24 of a base 14. Accordingly, a gasket 38 pinched between those opposing tops 46, 48 may provide a watertight seal. Alternatively, when in the closed position, the various side walls 28 of a cover 16 or some portion of those side walls 28 may be positioned interior to the side walls 24 of a base 14 (i.e., the side walls 28 of a cover 16 may nest within the side walls 24 of a base 14). In such embodiments, a gasket 38 may interface or create a seal between an outer surface 50 of the side walls 28 of a cover 16 and an inner surface 52 of the side walls 24 of a base 14.

In certain embodiments, a cover 16 may include an abutment surface 54 that extends around a perimeter of the cover 16. An abutment surface 54 may be shaped and sized to abut a top 48 or distal extreme of the various side walls 24 of a base 14. The various side walls 28 of a cover 16 may be positioned interior to an abutment surface 54. Accordingly, an abutment surface 54 may determine how far into a base 14 the various side walls 28 of a cover 16 are to extend.

In selected embodiments, a gasket groove 56 may be located between the various side walls 28 of a cover 16 and an abutment surface 54. When a gasket 38 is applied to a cover 16, a portion of the gasket 38 may extend into a gasket groove 56. To fit within a gasket groove 56, a gasket 38 may need to be compressed. This compression may seal an interface between a gasket 38 and a cover 16 against the intrusion of water. It may also bias a gasket 38 toward moving with a cover 16 as the cover 16 is pivoted out of the closed position and away from a base 14.

A gasket 38 may have an inner circumference that is less than the outer circumference of the outer surfaces 50 of the various side walls 28 of a cover 16. Accordingly, a gasket may need to stretch in order to extend around the outer surfaces 50 of the various side walls 28. The elasticity of the gasket 38 may respond to such stretching with a biasing force holding the gasket 38 tight to the outer surfaces 50 of the various side walls 28. This biasing force may bias a gasket 38 toward moving with a cover 16 as the cover 16 is pivoted out of the closed position and away from a base 14.

In selected embodiments, a gasket 38 may include one or more sealing ribs 58. A sealing rib 58 may be an extension extending around a perimeter of a gasket 38. When urged against an opposing surface, a sealing rib 58 may create an area of high contact pressure. Accordingly, a sealing rib 58 may seal an interface between a gasket 38 and the opposing surface against the intrusion of water.

A gasket 38 may include one or more sealing ribs 58. In certain embodiments, a first sealing rib 58a may be located so as to abut and seal against a portion of a cover 16. For example, a first sealing rib 58a may be located so as to abut and seal against an outer side wall 60 of a gasket groove 56. A second sealing rib 58b may be located so as to abut and seal against an inner surface 52 of the various side walls 24 of a base 14 whenever a cover 16 is in the closed position. A third sealing rib 58c may also be located so as to abut and seal against an inner surface 52 of the various side walls 24 of a base 14 whenever a cover 16 is in the closed position. Accordingly, in such embodiments, the second and third sealing ribs 58b, 58b may provide some redundancy in the sealing of the interface between a gasket 38 and a base 14.

In selected embodiments, a first sealing rib 58a may be larger (e.g., extend farther out) than a second or third sealing rib 58b, 58c. This may result in a first sealing rib 58a being compressed more than a second or third sealing rib 58b, 58c during installation or use. This higher compression may bias a gasket 38 toward moving with a cover 16 as the cover 16 is pivoted out of the closed position and away from a base 14.

In certain embodiments, as a cover 16 is pivoted in and out of the closed position, the side walls 24, 28 of a base 14 and cover 16 may rotate with respect to one another rather than translate. With side walls 24, 28 that nest and do not merely abut, this rotation may cause certain clearance issues that would not be present if only translation were involved in moving in and out of the closed position. Accordingly, a gap 62 may provide the clearance necessary to pivot into a nested arrangement. A gasket 38 may have a size and shape selected to fill and seal off that gap 62. Additionally, a gasket 38 may have a resiliency and elasticity selected to provide the clearance necessary to pivot into a nested arrangement. That is, as a base 14 and cover 16 rotate with respect to one another, a gasket 38 may resiliently flex, stretch, and deform as necessary to enable the side walls 24, 28 of the base 14 and cover 16 to rotate in and out of their nested arrangement.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A vented, waterproof container comprising:
   a base having an interior volume;
   a cover;
   the cover pivotably engaging the base and pivoting with respect to the base through a range of motion, the range of motion comprising a closed position wherein the cover and base cooperate to form an enclosure;
   a fishing-hook-retention medium formed of elastomeric material secured within the interior volume of the base;
   one or more apertures passing through at least one of the base and the cover; and
   at least one membrane covering the one or more apertures, the at least one membrane being permeable to water vapor and impermeable to liquid water.

2. The container of claim 1, wherein the cover has an interior surface and an exterior surface.

3. The container of claim 2, wherein the one or more apertures pass through the cover from the exterior surface to the interior surface.

4. The container of claim 3, wherein the at least one membrane abuts and extends along the interior surface.

5. The container of claim 1, further comprising a seal contacting both the base and the cover and creating a watertight interface therebetween when the cover is in the closed position.

6. The container of claim 5, wherein the seal frictionally engages the cover and the base to hold the cover in the closed position.

7. The container of claim 6, wherein the frictional engagement of the seal alone holds the cover in the closed position.

8. A vented, waterproof container comprising:
   a base
   a cover having an interior surface and an exterior surface;
   the cover hingedly connected to the base and pivoting with respect to the base through a range of motion, the range of motion comprising a closed position wherein the cover and base cooperate to form an enclosure;
   a fishing-hook-retention medium formed of elastomeric material secured to the base;
   a plurality of apertures passing through the cover from the interior surface to the exterior surface; and
   a membrane extending continuously adjacent the interior surface of the cover so as to cover each aperture of the plurality of apertures, the membrane being permeable to water vapor and impermeable to liquid water.

9. The container of claim 8, wherein the membrane is visible through the plurality of apertures when the cover is in the closed position with respect to the base.

10. The container of claim 8, further comprising an adhesive directly securing the membrane to the interior surface.

11. The container of claim 8, further comprising a bezel extending proximate a perimeter of the interior surface so as to hold the membrane against the interior surface.

12. The container of claim 8, wherein the plurality of apertures collectively form a logo, spell out a trademark, or mimic a coloration pattern of a fish.

13. A vented, waterproof container comprising:
   a base having an interior volume;
   a cover having one or more apertures passing therethrough;
   the cover pivotably engaging the base and pivoting with respect to the base through a range of motion, the range of motion comprising a closed position wherein the cover and base cooperate to form an enclosure;
   a fishing-hook-retention medium formed of elastomeric material secured within the interior volume of the base;
   a seal contacting both the base and the cover and creating a watertight interface therebetween when the cover is in the closed position; and
   a membrane covering the one or more apertures, the membrane being permeable to water vapor and impermeable to liquid water.

14. The container of claim 13, wherein the seal frictionally engages the cover and the base to hold the cover in the closed position.

15. The container of claim 14, wherein the frictional engagement of the seal alone holds the cover in the closed position.

16. The container of claim 13, wherein:
   the cover comprises an interior surface; and
   the membrane abuts and extends along the interior surface.

* * * * *